United States Patent
Armstrong

[11] 3,745,833
[45] July 17, 1973

[54] THICKNESS GAUGE
[75] Inventor: David Alun Armstrong, Glamorgan, Wales
[73] Assignee: British Steel Corporation, London, England
[22] Filed: July 26, 1971
[21] Appl. No.: 165,889

[30] Foreign Application Priority Data
Aug. 5, 1970    Great Britain.................. 37,821/70

[52] U.S. Cl. ............................. 73/67.8 R, 73/71.5
[51] Int. Cl. ........................................... G01n 29/04
[58] Field of Search............................ 73/67.8, 71.5

[56]         References Cited
        UNITED STATES PATENTS
2,751,783   6/1956   Erdman ...................... 73/67
3,662,590   5/1972   Shiraiwa ...................... 73/71.5
3,555,891   1/1971   Lewis........................... 73/71.5
3,625,051   12/1971  Vozumi........................ 73/71.5

Primary Examiner—Richard C. Queisser
Assistant Examiner—Arthur E. Kerosz
Attorney—Holcombe, Wetherill & Brisebois

[57]        ABSTRACT

In order to measure the position of a workpiece surface a laminar stream of fluid is projected through a datum point and towards the surface, and the distance through the fluid between the surface and the datum point is measured by determining the time for ultrasonic energy to be transmitted from the datum point to the surface and reflected back to the datum point. Knowledge of the position of the datum point gives the position of the workpiece surface. When no position measurement is required the stream of fluid is deflected from the workpiece surface to avoid the fluid adversely affecting the workpiece; for example, if the workpiece is a hot steel slab undesirable local cooling by the fluid is avoided. Several measurements can give information on workpiece thickness, profile or cross-section relevant to later manufacturing stages.

8 Claims, 4 Drawing Figures

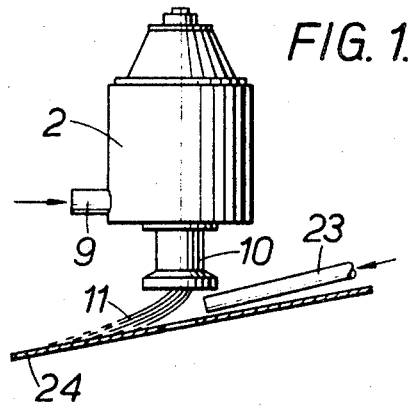
FIG. 1.
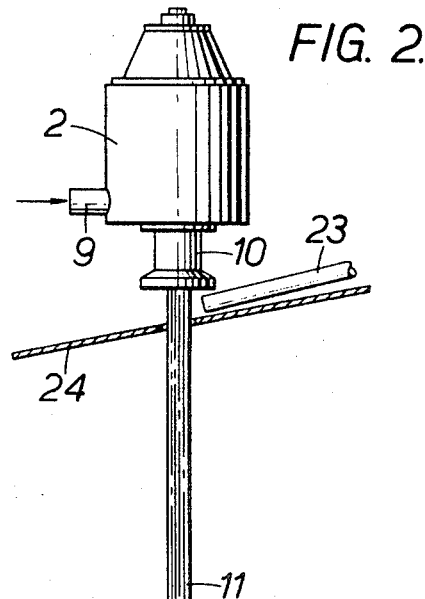
FIG. 2.
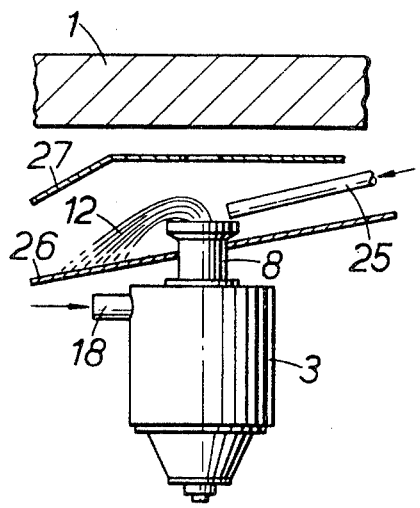
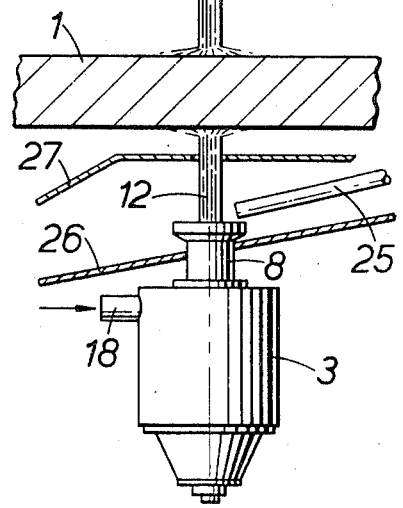

THICKNESS GAUGE

This invention relates to a method and apparatus for determining the position of a surface of a workpiece.

Measurement of the position of a surface of a workpiece allows computation of the workpiece thickness if the position of an opposite surface is known. It is often desirable to determine the position of a surface of a workpiece, or the workpiece thickness, before or during a manufacturing operation on it, particularly in the case where an automated manufacturing operation is to be carried out. For example, in the rolling of a hot steel slab, the work roll gap may be pre-set for a slab of specific thickness, and it is important to provide a check that a slab of the correct thickness has been received from the reheat furnace.

Measurement of the edge thickness of a slab is in many cases not ideal because of an effect termed 'dog-boneing' induced by a previous edge pass on the slab. The known method using a contact caliper has disadvantages resulting from the ease with which it can be damaged and the inevitable wear of the contacting surfaces. Radioisotope gauging techniques are not very suitable in the case of slabs which may have a thickness of about 20 cm and many also show variation in composition.

According to the present invention there is provided a method of determining the position of a surface of a workpiece, which method comprises directing a stream of fluid alternately away from and in a substantially laminar flow towards the surface of the workpiece, and measuring the distance between the surface and a datum point in the fluid, while the stream is directed towards and impinges on the surface, by means of ultrasonic energy transmitted from said point through the fluid stream and reflected back from the workpiece.

In a preferred form of the invention the method comprises establishing a substantially laminar stream of fluid directed at a surface of the workpiece, deflecting the stream away from the workpiece, and intermittently removing the deflecting influence to allow the substantially laminar stream to impinge upon the said surface, the distance between the workpiece and a datum point in the fluid being measured while the stream is undeflected by means of ultrasonic energy transmitted from said point through the fluid stream and reflected back from the workpiece.

Thus, this invention utilises a stream of fluid as the medium through which measurement is made and, compared with mechanical measuring devices the problems of mechanical damage and wear which may occur may thus be avoided.

The stream of fluid is only allowed to reach the workpiece intermittently, that is when a measurement is to be made, and this is particularly advantageous in, for example, the case where the workpiece is a hot steel slab, since a continuous stream of fluid such as water could cause undesirable local cooling.

It is necessary that the stream of fluid should be substantially laminar in flow in order to reduce interference and the development of random signals by turbulence in the stream. A substantially laminar stream has a smooth surface and contains no bubbles. The longer the stream of fluid between the datum point and the workpiece surface, the closer to the laminar flow should the stream be, in order to maintain an acceptably low level of interferance and random signals.

In this regard the time taken to establish laminar flow in a stream after the fluid starts to flow is relatively long compared with the time needed for transmitting the ultrasonic energy through the stream to determine the position of the workpiece. The method provided by the present invention however allows a laminar stream to be set up and then deflected from the workpiece, so that removal of the deflecting influence allows an already established laminar stream to reach the workpiece. Thus, the time during which the stream of fluid need impinge on the workpiece is still further reduced.

In the case where the workpiece is, for example, a flat-bottomed steel slab running on rollers, measurement of the distance between the top surface of the slab and the datum point in the stream provides a measure of the thickness of the slab if the distance between the datum point and the level of the tops of the rollers is known. However, in some cases, for instances when the slab shows considerable 'dog-boneing' after an edge pass, the centre of the base of the slab is raised above the level of the tops of the rollers. In such a case, the centre thickness of the slab can be determined by additionally applying the method of the invention to the base of the slab by means of a second stream of fluid, provided that the relative positions of the datum points in each stream of fluid are known.

It is particularly preferable that when two streams of fluid are used as described above the streams should be colinear. This can enable the distance between the two datum points to be determined in the absence of the work-piece by transmitting ultrasonic energy through a single stream of fluid flowing between these two datum points.

The stream or streams of fluid need not be vertical, and may be horizontal. Thus as well as the thickness of a workpiece, other dimensions such as width and length can be measured, and several measurements can be used to give a profile, area or average thickness.

The invention further provides apparatus for determining the position of a surface of a workpiece, which apparatus comprises means for directing a stream of fluid alternately away from and in a substantially laminar flow towards the surface of the work-piece, an ultrasonic probe arranged to be disposed in the fluid and operable to transmit ultrasonic energy along the stream towards the workpiece surface and to respond to the energy reflected back from this surface, and means for obtaining and processing data from this energy whereby to determine the distance between the workpiece surface and the probe.

The means for directing a stream alternately away from and towards the surface of the workpiece is preferably a combination of means for directing a substantially laminar stream towards the workpiece surface with deflection means for diverting the stream from the said surface. The deflection means is intermittently removable to allow intermittent impingement of the stream on the workpiece surface.

The intermittently removable deflecting influence can be, in appropriate circumstances, a solid body, and electric or magnetic field or a second fluid stream such as an air jet. In the case where the means for directing the stream of fluid comprises a nozzle, the deflecting influence can be means for directing the nozzle away from the workpiece surface.

One embodiment of the invention is illustrated in the accompanying drawings, in which:

FIG. 1 is a schematic side elevation of apparatus in accordance with the invention wherein the fluid streams are deflected;

FIG. 2 is a similar view of the same apparatus wherein the fluid streams are allowed to reach opposite surfaces of a workpiece;

Figure 3:
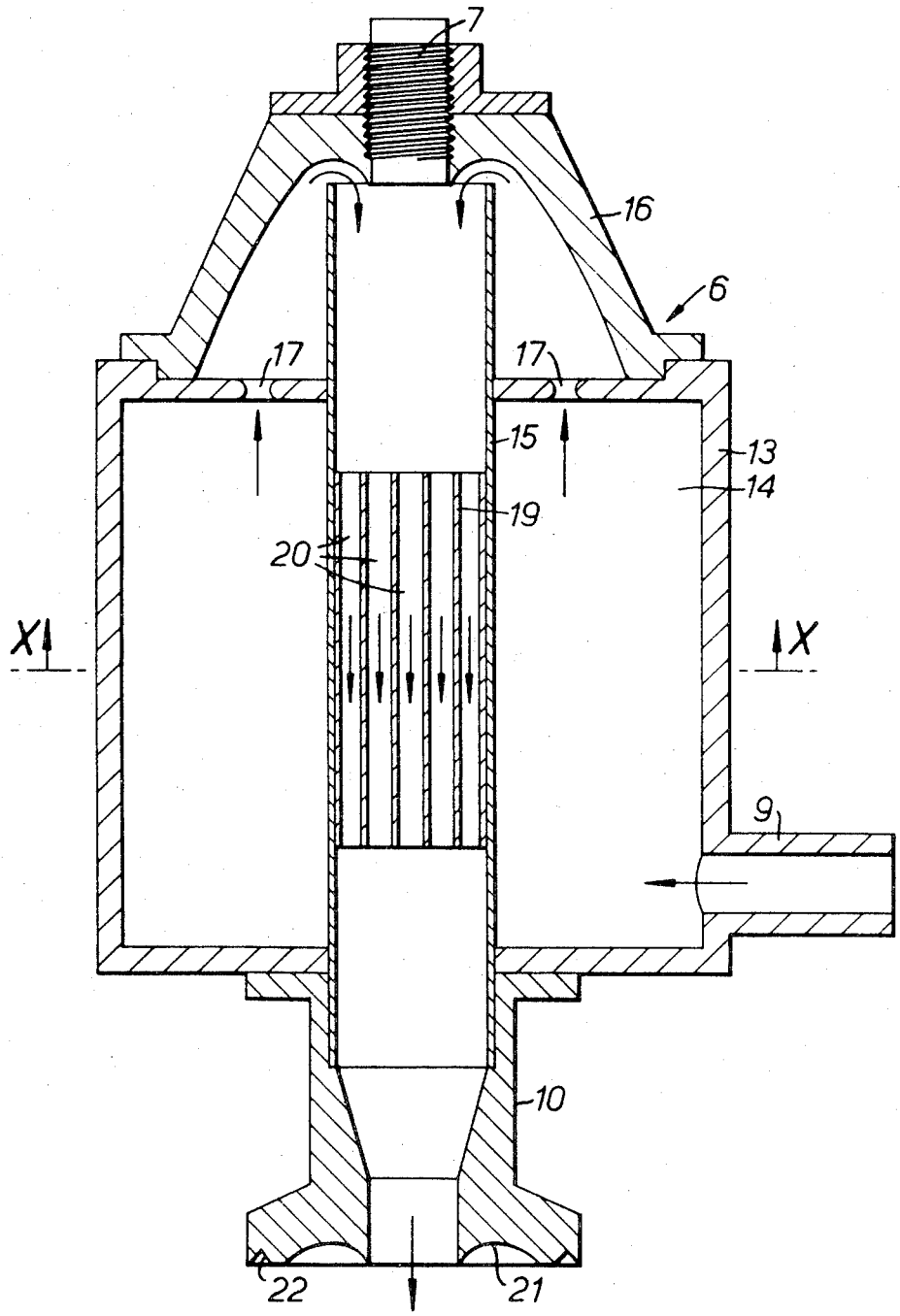
FIG. 3 is an axial section through the liquid reservoir and nozzle associated with the sensing head.

In FIGS. 1 and 2 of the drawings, a hot steel slab 1 whose thickness is to be measured is passing between an upper sensing head 2 and a lower sensing head 3. The upper sensing head 2 has a water inlet 9 and exit nozzle 10, and the lower sensing head 3 has a water inlet 18 and exit nozzle 8.

In FIG. 1, a stream of water 11 emerging from nozzle 10 is deflected by an air stream emerging from a jet 23. A plate 24 carries away the deflected water. Similarly, a stream of water 12 emerging from nozzle 8 is deflected by an air stream emerging from a jet 25, a plate 26 carrying away the deflected water.

When it is desired to measure the thickness of the slab, the air jets 23 and 25 are switched off giving rise to the situation shown in FIG. 2. The nozzles 10 and 8 are so constructed that a laminar flow of water exists within them, so that, when they are free from the deflecting air stream, laminar streams of water 11, 12 extend to the slab 1 from the sensing heads 2 and 3 respectively. The stream 11 passes through an aperture provided in the plate 24, and the stream 12 passes through an aperture in a third plate 27 which serves to catch the water splashing back from the slab 1 and divert it away from the laminar stream 12.

When the laminar streams 11 and 12 are thus established, the distance measurements are made as will be described, and thereafter the air jets 23 and 25 are re-activated causing reversion to the situation shown in FIG. 1. If the invention is used for testing the thickness of steel slabs emerging from a reheat furnace, one thickness measurement per slab is adequate, and the air jets will continue to deflect the streams of water until the next slab is in position for thickness determination.

Distance measurements are made by measuring the time interval between transmission of the ultrasonic energy and its reception after reflection from the workpiece. The ultrasonic probes may be so mounted in the sensing heads 2 and 3 to ensure that the ultrasonic energy is transmitted axially along the streams 11 and 12. The nozzles 10 and 8 through which the water issues may be designed to assist in the formation of this stable laminar water column by arranging for the air flow at the nozzle exit to follow a particular path, i.e. a toroidal path coaxial with the stream. The design of the nozzles may also ensure that the water accumulated on the surface will drip freely, clear of the stream.

Figure 4:
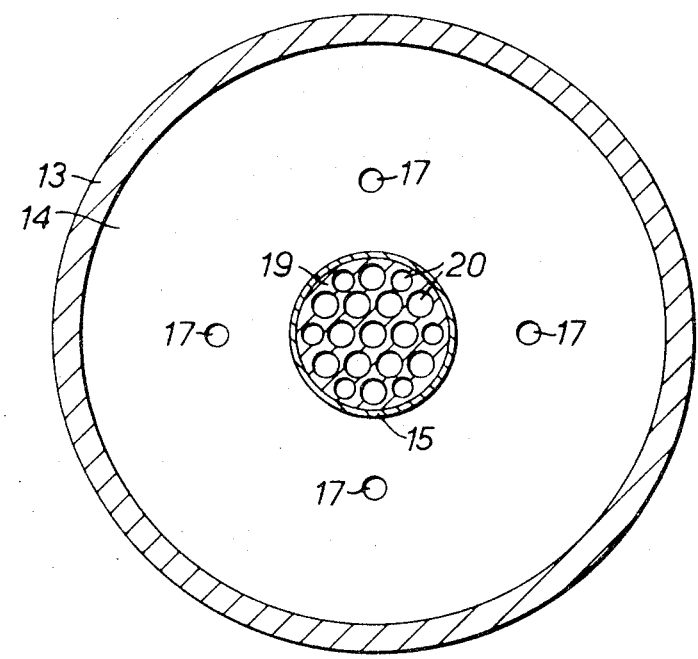
FIG. 4 is a cross-section along lines X—X in FIG. 3.

A sensing head suitable for use as the sensing head 2 is described and illustrated in co-pending U.K. Patent Application No. 61544/69 and is illustrated in FIG. 3 and 4 herewith. The sensing head comprises a water reservoir 6 and a piezo-electric transducer 7 connected to pulsing and data processing equipment (not shown). Water flows into the reservoir via an inlet 9 and issues from a nozzle 10 as a laminar stream 11 falling on to the slab from a height of say 5 feet. The reservoir is designed to assist in providing a constant head of water so as to maintain a continuous flow.

Mounted as the head of this stream is the transducer 7 by which ultrasonic energy is transmitted to and reflected back from the slab, and this is coupled to the data processing equipment. The data processed is effectively a representation of the distance between the surface of the slab on which the water falls and the transducer and this is determined by electronic measurement of the time interval between the transmitted pulses and reflected "echo" pulses from the slab surface or the overlying water/stream interface.

In FIGS. 3 and 4, the reservoir 6 comprises a cylindrical body 13 defining an annular chamber 14 about a central tube 15, the chamber 14 communicating with another chamber defined by an inverted cup-shaped cylindrical housing 16 through a number of apertures 17. The housing 16 is shaped to constrain water to flow co-axially into the upper end of the tube 15 which is spaced slightly from the inner surface of this housing and water flows downwardly through a flow alignment member in this tube, this member comprising a cylindrical block 19 having a number of axially extending cylindrical bores 20 formed in it.

Water issues from the outlet nozzle 10 which is specially designed to avoid fluting ect. and maintain laminar flow, and to this end its undersurface is channelled at 21 to induce a toroidal air-path around the issuing stream and assist in constraining the air around the water column in the form of a laminar boundary layer. Further a circular channel 22 is also formed in this undersurface, this channel being designed to prevent water collected in the upper surfaces of the reservoir from interfering with the stream, that is, water dripping from this surface is kept free from the stream so as not to interfere with its flow characteristics.

Mounted at the head of the water column, and aligned in such a manner as to be co-axial with it, is the piezoelectric crystal transducer 7 for the transmission and reception of ultrasonic energy. The crystal is electrically coupled to the processing equipment.

In an alternative use of the invention, measurement of the surface height or absolute thickness of a slab can be made at opposite edges of the slab, thereby providing a measure of the extent to which the slab has a wedge-shaped cross section. Measurements are preferably made one on each of the longer edges of a rectangular slab.

We claim:

1. A method for determining in successive examinations the position of the surface of a workpiece, which method comprises the steps of:
    a. directing a substantially laminar jet of fluid alternately against the surface of the workpiece and away from said surface without interrupting the flow of fluid in the jet while making said examinations;
    b. measuring the distance between the surface and a datum point in the fluid while the jet is directed against said surface by means of ultrasonic energy transmitted from that point through the fluid and reflected back from the workpiece surface.

2. A method according to claim 1 in which two separate jets of fluid are used to determine the positions of two opposite surfaces of the workpiece, to give a measure of the dimension of the workpiece between the two surfaces.

3. A method according to claim 1 applied by two separate streams of fluid to determine the positions of two opposite surfaces of the workpiece, to give a measure of the dimension of the workpiece between the two surfaces.

4. A method of determining the position of a surface of a workpiece, which method comprises the steps of:
  a. establishing a substantially laminar stream of fluid directed at the surface of the workpiece;
  b. applying a deflecting means to deflect the stream away from the workpiece;
  c. intermittently removing the deflecting means to allow the substantially laminar stream to impinge upon the said surface; and
  d. measuring the distance between the surface and a datum point in the fluid while the stream is undeflected by means of ultrasonic energy transmitted from said point through the fluid stream and reflected back from the workpiece.

5. A method according to claim 4 applied by two separate streams of fluid to determine the positions of two opposite surfaces of the workpiece, to give a measure of the dimension of the workpiece between the two surfaces.

6. A method according to claim 5 in which the two streams of fluid are colinear and the distance between the datum points in each stream of fluid is determined in the absence of the workpiece by transmitting ultrasonic energy through a single stream of fluid flowing between these two datum points.

7. Apparatus for determining in successive examinations the position of a surface of a workpiece, which apparatus comprises:
  a. fluid supply means for directing a stream of fluid in a substantially laminar flow towards the surface of the workpiece;
  b. intermittently removable deflection means for diverting the stream from said surface;
  c. an ultrasonic probe arranged to be disposed in the fluid and operable to transmit ultrasonic energy along the stream towards the workpiece surface and to respond to the energy reflected back from this surface during said successive examinations; and
  d. means for obtaining and processing data from the reflected ultrasonic energy whereby to determine the distance between the workpiece surface and the probe.

8. Apparatus as claimed in claim 7 in which the deflection means is an air jet directed at the stream.

* * * * *